United States Patent
Gadini et al.

[11] Patent Number: 6,052,993
[45] Date of Patent: Apr. 25, 2000

[54] ACTUATOR OF THE THERMAL TYPE AND METHOD FOR CLOSING AND SEALING THE BODY OF AN ACTUATOR OF THE THERMAL TYPE

[75] Inventors: Costanzo Gadini; Renato Gaj, both of Casale Monferrato, Italy

[73] Assignee: Eltek S.p.A, Casale Monferrato, Italy

[21] Appl. No.: 09/262,379

[22] Filed: Mar. 4, 1999

[30] Foreign Application Priority Data

Mar. 5, 1998 [IT] Italy .................................. TO98A0181

[51] Int. Cl.$^7$ ...................................................... F01B 29/10
[52] U.S. Cl. ........................................... 60/527; 92/165 R
[58] Field of Search .............................. 60/527; 92/165 R

[56] References Cited

U.S. PATENT DOCUMENTS

| | | | |
|---|---|---|---|
| 4,757,751 | 7/1988 | Munoz | 92/165 R |
| 4,946,143 | 8/1990 | Bauer et al. | 92/165 R X |
| 5,079,992 | 1/1992 | Bauer et al. | 92/165 R X |
| 5,213,024 | 5/1993 | Huber et al. | 92/165 R X |
| 5,509,269 | 4/1996 | Kuze | 60/527 |

*Primary Examiner*—Hoang Nguyen
*Attorney, Agent, or Firm*—Levine & Mandelbaum

[57] ABSTRACT

An actuator of the thermal type has a body, wherein a chamber is defined for containing a material which expands as a function of the temperature of said body; a shaft, having one end directly dipped into said material; the shaft being movable as a function of the increase and decrease of volume of said material; a closure and sealing device for the chamber and the shaft, including at least a closure element, configured as a washer or similar element, which is apt to cooperate mechanically with said body, at least a first sealing element, such as a bushing or similar element, which is apt to perform a first sealing on said shaft, and at least a second sealing element, such as a ring or similar element, which is apt to perform a second sealing on said shaft. The closure and sealing device has lower-support apparatus for at least one of the first sealing element and second sealing element, the lower-support apparatus being associated with the body at a pre-defined point of the latter, the closure element and lower-support apparatus delimiting a precise housing zone in the body for the first and second sealing elements.

37 Claims, 1 Drawing Sheet

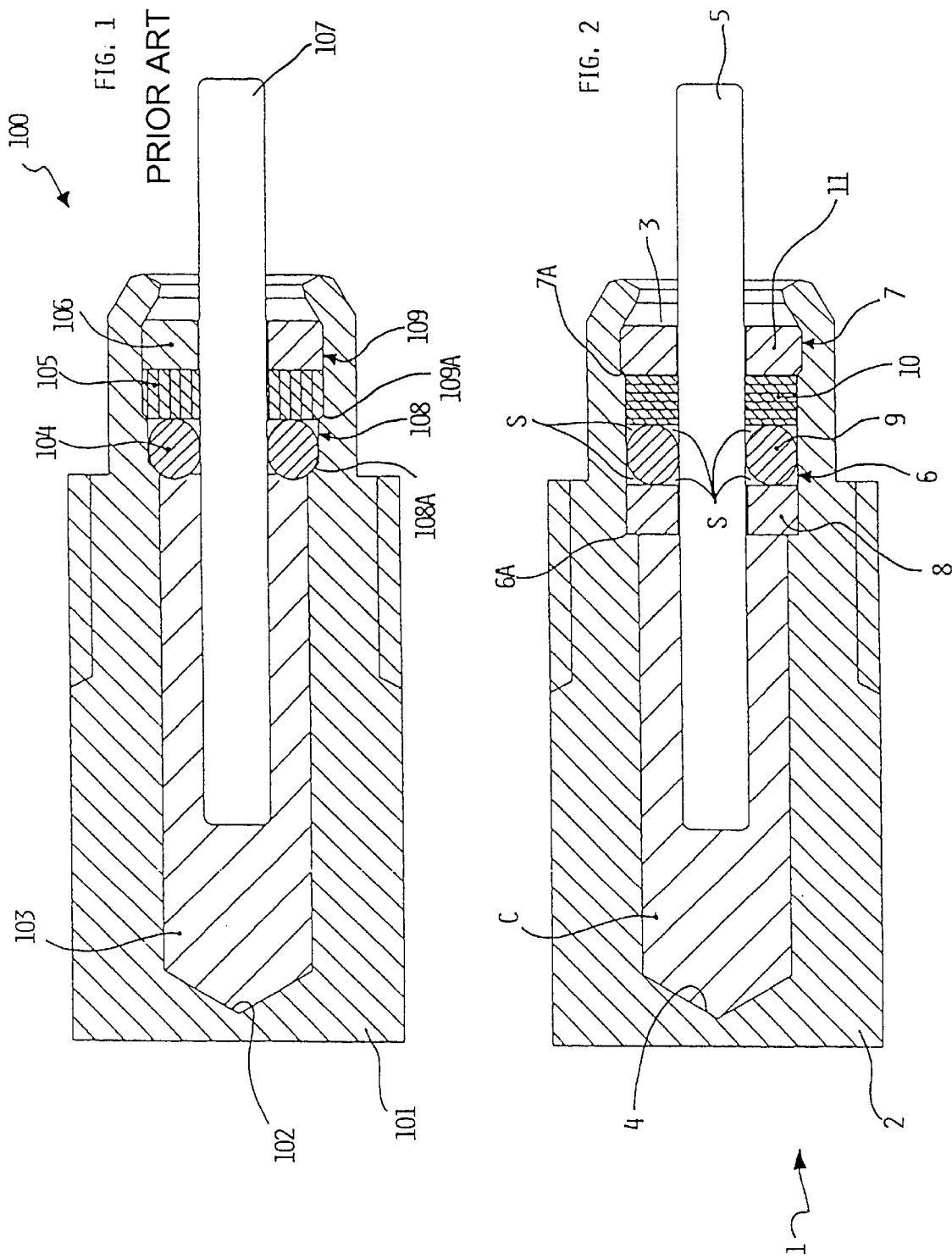

ACTUATOR OF THE THERMAL TYPE AND METHOD FOR CLOSING AND SEALING THE BODY OF AN ACTUATOR OF THE THERMAL TYPE

BACKGROUND OF THE INVENTION

The present invention refers to an actuator of the thermal type, and a to a method for closing and sealing the body of an actuator of the thermal type.

Actuators of this kind are known and used in various fields, among which the field of household appliances, air conditioning, hygienic-sanitary installations, motor-vehicles.

Such actuators usually consist at least of a thermosensitive element, which includes a body made of a thermal conductive material (such as metal), which is submitted to a heat source.

In the above body a chamber is provided, for containing a material (such as a wax) being expandable as a function of the temperature and, at least partially, a shaft or pusher is provided; to this purpose, the body has an opening defined on one of its longitudinal ends, which is sealed by a suitable device.

The consequence of a heat transmission to the body of the thermosensitive element is an expansion of the expandable material; such an expansion determines a linear displacement of the pusher to the outside of the body, until a determined position is reached, generally established by a mechanical limit stop, which can be defined as a stable work position. When the heat transmission to the body of the thermosensitive element decreases or is interrupted, the expandable material shrinks and let the pusher gradually return to its initial rest position, also with the aid of an elastic recall element, such as a spring.

In some solutions, the heat source for the body of the thermosensitive element may be an electric heater, such as a resistor with a positive temperature coefficient (PTC) supplied through two terminals or contacts; this solution reflects the instance of the actuator devices used in the automotive or household appliance fields.

According to other solutions, the actuation of the thermosensitive element is determined by the temperature of the environment where it operates: This is the case of mixers connected to water supply pipes of hygienic-sanitary installations in residential building construction, where the body of the thermosensitive element is subject to the temperature of the water flow to be regulated.

Thermosensitive elements as mentioned above can be manufactured in a simple and cheap way; their significant advantages are constituted by the considerable power they can develop, having regards their limited dimensions, and the low operation noise.

In order to seal the chamber containing the expandable material and obtain the required sealing on the pusher, a suitable tight closure device is commonly provided, which are housed in one same seat in correspondence of the above longitudinal opening of the body; the device usually includes a bushing in elastic material, typically Teflon®, and two metal washers, i.e. an upper one and a lower one, which "pack" or "sandwich" the bushing. The above bushing has to be inserted on the pusher with interference, in order to warrant the required sealing, and this fact causes significant friction effects on the pusher itself.

The problem is made more critical by the fact that the bushing can be compressed or squeezed between the two metal washers, when the end of the body where the above opening is delimited is mechanically riveted, i.e. folded or "choked" on the upper washer, to obtain the tight closure of the chamber containing the expandable material; this may cause too high a compression of the bushing on the pusher, which makes the above problem more crucial.

It should also be pointed out that the Teflon® bushing tends to expand its volume when the body of the thermosensitive element is heated during operation; since the bushing is compressed in a single seat, its expansion causes further friction effects on the pusher.

Moreover, such an expansion has the effect of causing microextrusions of the material of the bushing: in other words, small portions of the material tend to enter the very small side passages existing between the central holes of the metal washers and the pusher passing through them; such leakages of the bushing lead to an early degradation of the sealing and, consequently, of the thermosensitive element.

The above drawbacks are such to generate substantial malfunctions of the thermosensitive elements, in most of their common applications; the use of thermosensitive elements so conceived can be especially critical in those instances where a high sensitivity of the device to the thermal changes induced to the body of the same and a considerable operation speed are required.

From U.S. Pat. No. 5,572,869 an actuator of the thermal type is described, including a thermosensitive element, wherein a sealing device is provided, in the form of a bushing and a seal ring; a schematic section of such a thermosensitive device is shown schematically in FIG. 1.

This known thermosensitive device, indicated as a whole with 100, has a body made of metal material 101, within which a chamber 102 is defined, containing a wax 103 or similar material which expands with the increase of temperature.

Reference 104 indicates a sealing ring (O-Ring), while 105 and 106 indicate a bushing in Teflon® and a brass washer respectively; the bushing 105 has a restrained size compared to the dimensions used in the above state of the art.

Reference 107 indicates a stainless steel shaft, a portion of which extending outside the body 101, through the holes of the center of the ring 104, of the bushing 105 and of the washer 106.

For the assembly purposes of the element 100, the chamber 102 is filled with a preset amount of wax 103 and then the shaft 107 is inserted into it, making sure that both elements 104 and 105–106 preliminarly associated with the shaft reach their respective work seats; in particular, following the assembly, the ring 104 is positioned in a housing 108, defined by a cylindrical widening of the chamber 102, while the bushing 105, which is inserted with interference on the shaft 107, and the washer 106, are positioned one on top of the other in a seat 109, being also defined by a cylindrical widening of the chamber 102, obtained above the housing 108 and having a larger diameter than the chamber.

Now, the upper end of the body 101, defining the opening through which the above elements can be inserted in the chamber 102, is mechanically riveted, i.e. folded over the washer 106, so as to obtain a tight closure of the chamber 102, locking both the bushing 105 and the seal ring 104 in the seat 109 and the housing 108, respectively.

The thermosensitive element described in U.S. Pat. No. 5,572,869 has some drawbacks, being due to the type of assembly of its components.

A first problem is due to the fact that a proper housing seat is not provided for the seal ring 104, for the following reasons.

Referring to the device described in U.S. Pat. No. 5,572,869, the seal ring 104 is in direct contact with the bushing 105, whose function—according to the current technique—should have the function to prevent portions of the ring 104 from entering the side spaces between the central hole of the washers 106 and the shaft 107 passing through it, towards the outside of the body 101 during the shaft movements 107 and due to the wax thrust.

However, according to the above prior art document, the working position of the bushing 105 is not at all certain, as it will become apparent later, and there is no suitable element provided underneath the ring 104 to delimit a precise seat.

As it can be seen in FIG. 1, in fact, the ring 104 is resting underneath on a shoulder 108A defined by the lower end of the housing 108, so that there is no well delimited basement on which the ring can possibly adapt itself: as a result, there is a situation where the ring is only performing a radial sealing on the shaft, as provided by the usual technique: however, in the specific application, such a contribution to tightness seems to be a moderate and irregular one.

Considering, in fact, that the shaft 107 is subject to movements in both directions, it is obvious that after a certain number of actuations the ring 104 may also be subject to settling movements downwards (it is pointed out that actuators as mentioned above should perform some tens of thousand actuations).

Another problem arising from the arrangement shown in FIG. 1 is that, according to U.S. Pat. No. 5,572,869, the bushing 105 is placed In the same seat 109 directly underneath the washer 106.

This determines the risk for the bushing 105 to be pushed downwards, by the washer 106, on the lower shoulder 109A of the seat 109, during the riveting operation of the body 101. As a result, the bushing runs the risk of being compressed on the shaft and even deformed on its lower part, i.e. a much higher deformation than that being typically caused during the usual operation of the device: in fact, the bushing 105 rests directly over a small sized shoulder (109A) and is subject to settlements, under the thrust of the washer 106, which turn to device malfunctions with time.

The thrust downwards of the bushing 105 and the resulting deformation then contribute to an excessive compression on the seal ring 104, which may become irregularly distorted since it has no suitable resting base.

Moreover, under the thrust of the bushing 105, the ring 104 may undergo settlements on the edges of the shoulder 108A, and the settlements may even change the volume of the chamber 102 containing the wax 103, so cause an undesired change in the feedback of the thermosensitive element, i.e. in its operation; to this purpose, it should be noticed that just a few tenths of millimeters of displacement of the ring 104 downwards, and therefore a minimum change of volume of the chamber 102, can lead to a high dangerous change of the device thrust power.

A further problem of the actuator described in U.S. Pat. No. 5,572,869, and somehow associated with the previous drawbacks, is due to the fact that no suitable guiding device towards the more internal portion of the body 101 is provided for the shaft 107.

In particular, small oscillations or operation clearances of the shaft 107 may cause a widening of the central hole of the bushing 105, thus further reducing its performance and leading to a radial slackening of the radial seal of the ring 104. This is due to the fact that the shaft 107 is practically maintained in its position by the washer 106 in stiff material alone; underneath this washer, in fact, the shaft 107 is only constrained by a ring 104, made of elastic material for its own nature, i.e. yielding easily, and by a bushing 105 also possibly subject to distortion phenomena during the operation of the device and/or the riveting operation of the body 101.

SUMMARY OF THE INVENTION

The present invention has the purpose of solving the above drawbacks.

Within this general frame, it is the aim of the present invention to provide an actuator of the thermal type whose structure is improved compared to the known state of the art, and thus having a higher reliability and efficiency in time; a further aim of the present invention is to provide an actuator of the thermal type which has an improved sensitivity and intervention speed compared to the known solutions.

These and other aim, that will become more apparent later, are reached according to the present invention by an actuator of the thermal type and a method for closing and sealing the body of an actuator of the thermal type incorporating the features of the annexed claims, that form an integral part of the following description.

DESCRIPTION OF THE DRAWINGS

Further aims, features and advantages of the present invention will be clear from the following detailed description and the annexed drawings, which are supplied by way of non limiting example, wherein:

FIG. 1 shows schematically a side section of a thermosensitive actuator according to the technique as described in U.S. Pat. No. 5,572,869;

FIG. 2 shows schematically a side section of a thermosensitive actuator according to the teachings of the present invention.

DESCRIPTION OF THE PREFERRED EMBODIMENT

In FIG. 2 a thermosensitive element is illustrated, simply called "actuator" in the following description for the sake of brevity, which is realized in accordance with the teachings of the present invention. Such an actuator, indicated as whole with 1, includes a body 2 manufactured with a thermal conductive material; if required, the material used to manufacture the body 2 may also be electrically conductive, in those instances where the heating required for the operation of the actuator has to be generated by a PTC heater; by way of example, the body 2 can be made of metal, have a quadrangular section, particularly of 6×6 mm.

One longitudinal end of the body 2 has an opening 3; within the body 2 a chamber 4 is defined, having for example a cylindrical section; such a chamber 4 contains a material C expanding with temperature, such as a wax.

Reference 5 indicates a shaft made for example of stainless steel, a portion of which is inserted in the body 2 through the opening 3, and therefore embedded or dipped in the material C; an opposite portion of the shaft 5 protrudes outside the body 2.

References 6 and 7 indicate two seats, which are defined by respective cylindrical widenings of the chamber 4, in an area being close to the opening 3.

As it can be seen, the seat 6 being more inside the body 2 with respect to the opening 3 has a greater vertical development than the seat 7; in particular, in the embodiment shown by way of example in FIG. 2, the length of the seat 6 is about three times the length of the seat 7.

A stiff washer 8, an elastic seal ring 9 and an elastic gasket or cylindrical bushing 10 are inserted, in the given order, in the seat 6.

The washer 8 is preferably made of a metal material, such as brass; the seal ring 9, of the O-Ring type, is preferably made of rubber or similar elastic material; the bushing 10 is preferably made of Teflon® or similar elastic material; the ring 9 is preferably made of a material being more easily deformable than the bushing 10.

In the seat 7, on the contrary, a washer 11 is inserted, preferably made in metal such as brass, having a larger diameter than the washer 8; the lower washer 8 rests on the shoulder 6A being defined between the seat 6 and the chamber 4, while the upper washer 11 rests on the shoulder 7A being defined between the seat 6 and the seat 7.

The shoulder 7A has a flaring, similar to a funnel, whose function is to facilitate components 8, 9, 10 reaching their relevant seat 6 during the assembly; advantageously, the upper washer 11 has a double flaring, i.e. it is chamfered along its circumference on both faces; this double flaring of the washer 11, besides making its insertion easier inside the opening 3, also has the double function to allow the exact mating with the flaring of the shoulder 7A on one side, and to guide the deformation of the riveted part of the body 2 on the other side, for allowing an exact mating with it (it has to be pointed out that such a double flaring is not provided by the cited known solutions, since in these cases the upper washer rests directly on a bushing, and not on a relevant shoulder). It should also be noticed that the double flaring of the washer 11 allows its easy assembly in an automated manufacturing process. since no special orientation is requested for it; in fact, in the case of washers with a flaring on just one side, it would be difficult to orient them in the correct direction.

Thus, as it can be seen, the upper washer 11 is housed in a first seat (7) differing from the second seat (6) wherein the sealing organs 9 and 10 operate on the shaft 5 and wherein also the washer 8 is inserted, the washers 8 and 11 delimiting a well defined and precise housing zone (6, 7) for the sealing organs 9 and 10.

Unlike the known state of the art previously mentioned, the riveting operation of the body 2, and consequently the thrust on the upper washer 11, does not entail any uncontrolled risks of compression on the bushing 10; this is allowed in virtue of the fact that the washer 11 and the bushing 10 are housed in two different seats, the seat 6 for the bushing being more inside the body 2 and having smaller dimensions than the seat 7 of the bushing 11.

Thus, due to the presence of the shoulder 7A between the washer 11 and the bushing 10, the risk is prevented that the pressure being exerted on the washer during the riveting step of the body 2 be excessive, with the consequent undesired deformation of the bushing; on the contrary, according to the invention, a moderate thrust downwards, exerted by the washer 11 on the bushing 10, is predetermined and controlled, so as not to cause any undesired effects.

According to the invention, in fact, such a moderate thrust of the washer 11 on the bushing 10 is not suitable to cause it any distortions, but only a mere downwards displacement; this is allowed by the presence of the underlying seal ring 9 made of plastic material.

Thus, such a downwards displacement of the bushing 10 causes a predetermined compression of the ring 9, which is free to adapt its shape to the surrounding surfaces; this mean a better tightness on the shaft 5, without causing however any substantial friction increments on the latter or extrusions of the elastic material constituting the ring 9.

Important practical results of the present invention, concerning the operation of the ring 9, are also obtained through the presence of the lower washer 8. Such a lower washer 8, acting as a lower support for the seal ring 9, allows the precise delimitation of the seat wherein the ring 9 should operate, ensuring a wide supporting surface; this differs from the known state of the art, where the seat for the seal ring is not safely delimited, neither in its upper part nor in the lower one, and where the supporting surface is also quite small.

According to the present invention, on the contrary, the presence of the washer 8 and the bushing 10 in the same seat 6 allows for a definition of a regular housing zone for the ring 9, which is well delimited in all directions. As an important result, empty areas (S) remain available around the ring 9, where it can expand when it is either compressed or heated.

In this view, the seal ring 9 performs a further function, besides sealing and compensating the downwards thrust of the bushing 10 as mentioned above.

This additional function is that of also compensating the usual volumetric self-expansions of the Teflon® bushing, which typically occur during the operation, when the temperature of the thermosensitive element increases.

According to the present invention, a part of such a expansion of the Teflon® is compensated just by a further compression on the ring 9, which is free to vent and consequently adapt its own section to the free surrounding spaces; as said above, according to the present invention, the ring is provided with a safe housing seat, which is delimited on top by the lower surface of the bushing 10 and on the bottom by the upper surface of the washer 8. As a result, also due to the slight compression on the ring 9 during the riveting step, some free spaces remains around the ring, some of them indicated with S in FIG. 2; the free spaces S provide a natural vent space for the likely deformation of the ring 9 caused by the compression of the bushing 10 standing above, or by the self-expansion of the bushing 10, and/or by the likely expansion of the ring 9 itself during the operation, when the temperature of the device is high.

Finally, the lower washer 8 has the important function of guiding the shaft 5.

As previously said, according to the known state of the art, in fact, the sole stiff guide element of the shaft consists of an upper closure washer; underneath it, the shaft is only guided by a seal ring, made of elastic material for its own nature, i.e. easily yielding, and by a bushing in Teflon®, subject to deformation phenomena during the operation of the device and/the or riveting of the actuator body, as previously mentioned.

Therefore, under some operating conditions, there is the risk for the shaft to swing or deviate in its stroke; such oscillations or clearances, even if moderate ones, may determine undesired widenings in the central hole of the Teflon® bushing and/or of the seal ring, i.e. leading to a further reduction of the functional features of the thermosensitive element or actuator as described in U.S. Pat. No. 5,572,869.

As mentioned above, this specific problem related to the known state of the art is obviated according to the present invention by virtue of the lower washer 8, which provides a further guidance device for the shaft 5, being more inside the body 2 of the actuator 1 compared to the washer 11. Thus, in other words, the shaft 5 is constrained at two separate points, one located more inside than the other compared to the body 2 of the actuator 1, so that no functions other than the main sealing function is assigned to the elements 9 and 10.

From the above it is clear how the structure of the actuator according to the present invention is improved with respect to the known state of the art and how an actuator device with increased reliability, performance, sensitivity and operation fastness is obtained.

The features of the actuator device being the subject of the present invention are clear from the above description.

Specifically, an actuator of the thermal type 1 has been described, which includes:

a body 2, wherein a chamber 4 is defined for containing a material C which expands as a function of the temperature of the body, a shaft 5, having one end directly dipped in the material C, and being movable as a function of the increase and decrease of volume of the material C, a closure and sealing device for the chamber 4 and the shaft 5, comprising:

at least a closure element, realized through the washer 11 or similar element, which is apt to cooperate mechanically with the body 2, at least a first sealing element, realized by the bushing 10 or similar element, which is apt to perform a first sealing on the shaft 5, and at least a second sealing element, realized by the ring 9 or similar element, which is apt to perform a second sealing on the shaft 5, wherein the closure and sealing device further includes a lower support for the bushing 10 or the ring 9, realized by the washer 8 or a similar element; the washer 8 is associated with the body 2 at a pre-defined point 6A and delimits with the washer 11 a precise housing zone in the body 2 for the bushing 10 and the ring 9; advantageously, at least two different seats are delimited in the housing zone, and particularly the seat 7, wherein the washer 11 is arranged, and the seat 6, whose radial dimensions are smaller than the ones of the seat 7, wherein the bushing 10 and/or ring 9 are arranged.

The previously mentioned advantages are enhanced by an appropriate combination and cooperation of the above elements, and namely:

the upper washer 11, which realizes the functions of locking mechanically the sealing organs 9 and 10, of guiding the shaft 5 in a point close to the opening 3 and of delimiting, with the washer 8, a specific housing area for the sealing organs;

the bushing 10, which realizes the function of obtaining a first sealing on the shaft 5, of safely delimiting the top part of the housing for the seal ring 9 and of providing for a regular controlled compression on the same ring, in order to increase its sealing features;

the seal ring 9, which realizes the function of obtaining a second sealing on the shaft 5, of allow the downwards displacement of the Teflon® bushing during the riveting step of the body 2, and of compensating the volumetric expansion of the same bushing, in order to avoid any extrusions during the actuations of the device; and the lower washer 8, which realizes the function of supporting the seal ring 9, of guiding the shaft 5 in a point close to the inside of the chamber 4 and of delimiting with the washer 8 a specific housing zone for the ring 9 and the bushing 10.

The above performances are advantageously enhanced through a proper splitting of the above elements in separate seats, being delimited in a same housing zone, i.e.:

a first seat 7, closer to the opening 3 of the body 2 of the actuator 1, assigned for the housing of the upper washer 11, which rests on a specific shoulder 7A, so avoiding undesired distortions of the underlying Teflon® bushing;

a second seat 6, having a smaller size than the previous one and more inside the body 2, assigned for the housing, in the following order, of the lower washer 8, which rests on a specific shoulder 6A, the seal ring 9 and the bushing 10.

From the above description also the advantages of the present invention are clear.

It is obvious that many changes are possible for the man skilled in the art to the actuator of the thermal type described above by way of example, without departing from the novelty spirit of the inventive idea, and it is also clear that in the practical actuation of the invention the components may differ in form and size from the ones described and be replaced with technical equivalent elements.

It will be appreciated, for instance, the possibility of inverting the insertion sequence of the ring 9 and the bushing 10; in such an instance the lower-rest element for the seal ring 9 would consist of the bushing 10, and the washer 11 delimit upwards the seat for the same ring. Thus, all above advantages according to the present invention can be reached also with this arrangement.

In fact, the likely thrust downwards generated by the washer 11 during the riveting step of the body 2 would be compensated by the ring 9, which will thus be subject to a radial compression enhancing its sealing function. On the other hand, the likely volumetric expansions of the bushing 10 would be contained downwards by virtue of the presence of the washer 8 could find free vent upwards, on the ring 9, which in its turn is free to expand in the spaces S.

Finally, also the possibility is indicated of providing more than one bushing and/or more than one ring, and a lower support for the seal ring. It is possible, for example, to think of an arrangement having several sealing groups, each one comprising a bushing 10, a ring 9 and a washer 8 inserted in respective different seats with a decreasing diameter compared to the opening 3.

It is also clear that the seal ring 9, which is subject to distortions to mate with its surrounding surfaces and/or free spaces could have a different geometry from the circular one, i.e. not be necessarily of the O-Ring type, provided the shape of its section ensures the presence of surrounding empty spaces S, at least when it is not under stress.

Finally, in case of sophisticated manufacturing processes, the correct positioning of the washers 8 and 11 can be obtained through a forced insertion or with interference of the washers at preset heights inside the body 2, instead of using shoulders 6A and 7A, always with the aim of obtaining a precise housing zone in the body 2 for the sealing elements 9 and 10.

What is claimed is:

1. An actuator of the thermal type, which comprises:
a body having a chamber for containing a material which expands as a function of the temperature of said body;
a shaft, having one end directly dipped into said material, said shaft being movable as a function of the increase and decrease of volume of said material;

closure and sealing means for said chamber and said shaft, comprising a closure element which is apt to mechanically cooperate with said body, at least a first sealing element which is apt to perform a first sealing on said shaft, and at least a second sealing element which is apt to perform a second sealing on said shaft, wherein said closure and sealing means comprise lower-support means for one of said first sealing element or second sealing element, said lower-support means being associated with said body at a pre-defined point, said closure element and said lower-support means delimiting a precise housing zone in said body for said first and second sealing elements.

2. An actuator of the thermal type, according to claim 1, wherein said housing zone of said body comprises at least two different seats.

3. An actuator of the thermal type, according to claim 2, wherein said closure element is positioned in a first seat defined in said housing zone of said body and said first sealing element is positioned in a second seat defined in said housing zone of said body having smaller radial dimensions than said first seat.

4. An actuator of the thermal type, according to claim 3, wherein said first sealing element and said second sealing element are both housed in said second seat.

5. An actuator of the thermal type, according to claim 1, wherein said first sealing element and said second sealing element are at least slightly compressed between said closure element and said lower-support means.

6. An actuator of the thermal type, according to claim 3, wherein said lower-support means are housed in said second seat.

7. An actuator of the thermal type, according to claim 1, wherein said second sealing element is placed in direct contact with said first sealing element.

8. An actuator of the thermal type, according to claim 1, wherein said second sealing element is located below said first sealing element.

9. An actuator of the thermal type, according to claim 1, further comprising a regular housing for said second sealing element, said regular housing being delimited on top by said first sealing element and on the bottom by said lower-support means.

10. An actuator of the thermal type, according to claim 1, wherein said pre-defined point of said body consists of a first shoulder between said second seat and said chamber, on which said lower-support means are resting.

11. An actuator of the thermal type, according to claim 3, wherein said closure element rests on a second shoulder defined in said body between said first seat and said second seat.

12. An actuator of the thermal type, according to claim 11, wherein said second shoulder has a flaring.

13. An actuator of the thermal type, according to claim 2, wherein said seats are defined by cylindrical widenings of said chamber.

14. An actuator of the thermal type, according to claim 3, wherein said second seat has a higher height than said first seat, the height of said second seat being at least twice the height of said first seat.

15. An actuator of the thermal type, according to claim 1, wherein said lower-support means consist of a stiff washer of a metal material.

16. An actuator of the thermal type, according to claim 1, wherein said closure means consist of a stiff washer of a metal material.

17. An actuator of the thermal type, according to claim 16, wherein said washer is chamfered along its circumference, on both faces.

18. An actuator of the thermal type, according to claim 1, wherein said first sealing element is located below said second sealing element.

19. An actuator of the thermal type, according to claim 18, wherein said lower-support means consist of said second sealing element.

20. An actuator of the thermal type, according to claim 18, further comprising a regular housing for said second sealing element, said regular housing being delimited on its bottom by said first sealing element and on its top by said closure element.

21. An actuator of the thermal type, according to claim 1, wherein empty spaces are provided between said second sealing element and surfaces of said housing zone.

22. An actuator of the thermal type, according to claim 9, wherein the section of said second sealing element is configured for providing empty spaces between said second sealing element and the surfaces delimiting said housing zone.

23. An actuator of the thermal type, according to claim 1, wherein said second sealing element is made of a material more easily deformable than said first sealing element.

24. An actuator of the thermal type, according to claim 1, wherein said second sealing element comprises an O-ring made of elastic material.

25. An actuator of the thermal type, according to claim 1, wherein said first sealing element is a bushing of the cylindrical type, made of elastic material.

26. An actuator of the thermal type, according to claim 1, further comprising guide means for said shaft, which guide means is located below said first sealing element and/or said second sealing element.

27. An actuator of the thermal type, according to claim 26, wherein said guide means coincides with said lower-support means.

28. An actuator of the thermal type, according to claim 1, wherein said closure and sealing means for said chamber comprise a plurality of sealing groups comprising a first sealing element, a second sealing element and lower-support means for one of said first and second sealing elements.

29. A method of closing and sealing the body of an actuator of the thermal type, said body having a chamber for containing a material which expands as a function of the temperature of said body, one end of a shaft being directly dipped in said material, said shaft being movable as a function of the expansion and the decrease of volume of said material, where closure and sealing means for said chamber and said shaft are provided, comprising:

a closure element which is apt to mechanically cooperate with said body, first sealing means apt to perform a first sealing on said shaft, a second sealing means apt to perform a second sealing on said shaft, wherein on a pre-defined point of said body lower-support means for one of said first sealing element and second sealing element are associated, said closure element and said lower-support means so delimiting a precise housing zone in said body for said first and second sealing element.

30. A method, according to claim 29, wherein in said housing zone of said body at least two different seats are delimited.

31. A method, according to claim 30, wherein a first seat and a second seat are defined in said body, the second seat having smaller radial dimensions than said first seat, where said first sealing means are positioned in said second seat and said closure element is positioned in said first seat.

32. A method, according to claim 31, wherein also said second sealing means are positioned in said second seat.

33. A method, according to claim 32, wherein also said lower-support means are positioned in said second seat.

34. A method, according to claim 29, wherein said closure element has the function of mechanically locking said first and second sealing means, of guiding said shaft in its motions and/or of contributing to safely delimit a housing for said second sealing means.

35. A method, according to claim 29, wherein said first sealing means have the function of performing a first sealing on said shaft, of contributing to safely delimit a housing for said second sealing means and/or of generating a controlled and regular compression of said second sealing means, namely during working operations on said body and/or during the operation of the actuator.

36. A method, according to claim 29, wherein said second sealing means have the function of performing a second sealing on said shaft, of compensating likely volumetric expansions of said first sealing means and/or of allowing a downwards displacement of said first sealing means during working operations on said body.

37. A method, according to claim 29, wherein said supporting means have the function of contributing to safely delimit a housing for said second sealing means and/or of guiding said shaft in its motions to in point being close to the inside of said chamber.

* * * * *